(12) United States Patent
Modha

(10) Patent No.: US 9,715,653 B2
(45) Date of Patent: *Jul. 25, 2017

(54) MULTI-SCALE SPATIO-TEMPORAL NEURAL NETWORK SYSTEM

(71) Applicant: INTERNATIONAL BUSINESS MACHINES CORPORATION, Armonk, NY (US)

(72) Inventor: Dharmendra S. Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/164,772

(22) Filed: May 25, 2016

(65) Prior Publication Data
US 2016/0275396 A1 Sep. 22, 2016

Related U.S. Application Data

(63) Continuation of application No. 13/562,205, filed on Jul. 30, 2012, now Pat. No. 9,400,954.

(51) Int. Cl.
*G06N 3/04* (2006.01)
*G06N 3/063* (2006.01)

(52) U.S. Cl.
CPC ......... *G06N 3/063* (2013.01); *G06N 3/04* (2013.01); *G06N 3/049* (2013.01); *G06N 3/0454* (2013.01)

(58) Field of Classification Search
CPC G06N 3/04; G06N 3/063; G06N 3/02; G06N 3/049; G06N 3/0454

(Continued)

(56) References Cited

U.S. PATENT DOCUMENTS 6,643,627 B2   11/2003  Liaw et al.
7,620,607 B1 * 11/2009  Ershov ............. G06F 17/30867
                                                  706/12

(Continued)

FOREIGN PATENT DOCUMENTS

CN      1450493 A     10/2003
WO   2010144947 A1    12/2010
WO   2012055593 A1     5/2012

OTHER PUBLICATIONS

Hierarchical Recurrent Neural Networks for Long-term Dependencies by Hihi published 1996.*

(Continued)

*Primary Examiner* — Stanley K. Hill
*Assistant Examiner* — Thomas Fink
(74) *Attorney, Agent, or Firm* — Sherman IP LLP; Kenneth L. Sherman; Hemavathy Perumal

(57) ABSTRACT

Embodiments of the invention relate to a multi-scale spatio-temporal neural network system. One embodiment comprises a neural network including multiple heterogeneous neuron populations that operate at different time scales. Each neuron population comprises at least one digital neuron. Each neuron population further comprises a time scale generation circuit that controls timing for operation of said neuron population, wherein each neuron of said neuron population integrates neuronal firing events at a time scale corresponding to said neuron population. The neural network further comprises a plurality of synapses interconnecting the neurons, wherein each synapse interconnects a neuron with another neuron. At least one neuron receives neuronal firing events from an interconnected neuron that operates at a different time scale.

15 Claims, 8 Drawing Sheets

(58) Field of Classification Search
USPC .................................................. 706/15–44
See application file for complete search history.

(56) References Cited

U.S. PATENT DOCUMENTS

| | | | |
|---|---|---|---|
| 2005/0049983 | A1 | 3/2005 | Butler et al. |
| 2006/0256907 | A1* | 11/2006 | Stalker ............... H03K 23/507 375/354 |
| 2008/0258767 | A1* | 10/2008 | Snider ................ G06N 3/063 326/46 |
| 2009/0287624 | A1 | 11/2009 | Rouat et al. |

OTHER PUBLICATIONS

Oscillatory Neurocomputers with Dynamic Connectivity, by Hoppensteadt, published 1999.*

Weakly Connected Neural Networks, by Hoppensteadt, published 1997.*

A Neurodynamic Account of Spontaneous Behaviour, by Namikawa, published Oct. 2011.*

Time Scale Hierarchies in the Functional Organization of Complex Behaviors, by Perdikis, published Sep. 2011.*

Emergence of Functional Hierarchy in a Multiple Timescale Neural Network Model: A Humanoid Robot Experiment, by Yamashita, published Nov. 2008.*

Van Pelt, J. et al., "Long-Term Characterization of Firing Dynamics of Spontaneous Bursts in Cultured Neural Networks," IEEE Transactions on Biomedical Engineering, Nov. 2004, pp. 2051-2062, vol. 51, No. 11, IEEE, United States.

IBM, "Neural Network Program and Method to Improve Response Time for Web to Host TN3270 and TN5250 Sessions," Nov. 2005, pp. 1-3, IBM Corporation, United States.

Mjolsness, E., "Neural Network, Pattern Recognition, and Fingerprint Hallucination," Doctoral Dissertation, Sep. 1985, pp. 1-87, California Institute of Technology, United States.

Merolla, P. et al., "A Digital Neurosynaptic Core Using Embedded Crossbar Memory with 45pJ per Spike in 45nm," Proceedings of the 2011 IEEE Custom Integrated Circuits Conference, 2011, pp. 1-4, IEEE, United States.

International Search Report and Written Opinion dated Oct. 3, 2013 for International Application No. PCT/IB2013/053907 from the State Intellectual Property Office, the P.R. China, pp. 1-8, Beijing, China.

Rast, A.D. et al., "Virtual Synaptic Interconnect Using an Asynchronous Network-on-Chip", Proceedings of the 2008 IEEE World Congress on Computational Intelligence (IJCNN), Jun. 8, 2008, pp. 2727-2734, IEEE, United States.

Ros, E. et al., "Real-Time Computing Platform for Spiking Neuron (RT-Spike)", Proceedings of the 2006 IEEE Transactions on Neural Networks, Jul. 5, 2006, pp. 1050-1063, vol. 17, No. 4, IEEE, United States.

Matsubara, T. et al., A Novel Asynchronous Digital Spiking Neuron Model and its Various Neuron-like Bifurcations and Responses, Proceedings of the International Joint Conference on Neural Networks, Jul. 31, 2011-Aug. 5, 2011, 741-748, IEEE, United States.

Hihi, S.E. et al., "Hierarchical Recurrent Neural Networks for Long-Term Dependencies", Proceedings of Advances in Neural Information System 8 (NIPS'95), 1996, pp. 493-499, MIT Press, United States.

Lang, K.J. et al., "A Time-Delay Neural Network Architecture for Isolated Word Recognition", Neural Networks, 1990, pp. 23-43, vol. 3, Pergamon Press, United States.

U.S. Non-Final Office Action for U.S. Appl. No. 13/562,205 mailed Nov. 28, 2014.

U.S. Final Office Action for U.S. Appl. No. 13/562,205 mailed Jan. 23, 2015.

U.S. Advisory Action for U.S. Appl. No. 13/562,205 mailed Apr. 21, 2015.

U.S. Non-Final Office Action for U.S. Appl. No. 13/562,205 mailed Aug. 13, 2015.

U.S. Final Office Action for U.S. Appl. No. 13/562,205 mailed Dec. 1, 2015.

U.S. Advisory Action for U.S. Appl. No. 13/562,205 mailed Feb. 26, 2016.

U.S. Notice of Allowance for U.S. Appl. No. 13/562,205 mailed Mar. 29, 2016.

U.S. Non-Final Office Action for U.S. Appl. No. 15/169,507 mailed Nov. 10, 2016.

U.S. Notice of Allowance for U.S. Appl. No. 15/169,507 mailed Mar. 20, 2017.

* cited by examiner

MULTI-SCALE SPATIO-TEMPORAL NEURAL NETWORK SYSTEM

This invention was made with Government support under HR0011-09-C-0002 awarded by Defense Advanced Research Projects Agency (DARPA). The Government has certain rights in this invention.

BACKGROUND

Embodiments of the invention relate to neuromorphic and synaptronic computation, and in particular, a multi-scale spatio-temporal neural network system.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are roughly functionally equivalent to neurons of a biological brain. Neuromorphic and synaptronic computation may comprise various electronic circuits that are modeled on biological neurons.

In biological systems, the point of contact between an axon of a neuron and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

BRIEF SUMMARY

Embodiments of the invention relate to a multi-scale spatio-temporal neural network system. One embodiment comprises a neural network including multiple heterogeneous neuron populations that operate at different time scales. Each neuron population comprises at least one digital neuron. Each neuron population further comprises a time scale generation circuit that controls timing for operation of said neuron population, wherein each neuron of said neuron population integrates neuronal firing events at a time scale corresponding to said neuron population. The neural network further comprises a plurality of synapses interconnecting the neurons, wherein each synapse interconnects a neuron with another neuron. At least one neuron receives neuronal firing events from an interconnected neuron that operates at a different time scale.

Another embodiment comprises communicating neuronal firing events between multiple heterogeneous neuron populations, wherein the neuron populations operate at different time scales. Each neuron population comprises at least one digital neuron. Each neuron of each neuron population integrates neuronal firing events targeting said neuron at a time scale corresponding to said neuron population. At least one neuron receives neuronal firing events from a neuron that operates at a different time scale.

These and other features, aspects and advantages of the present invention will become understood with reference to the following description, appended claims and accompanying figures.

DETAILED DESCRIPTION

Figure 1:
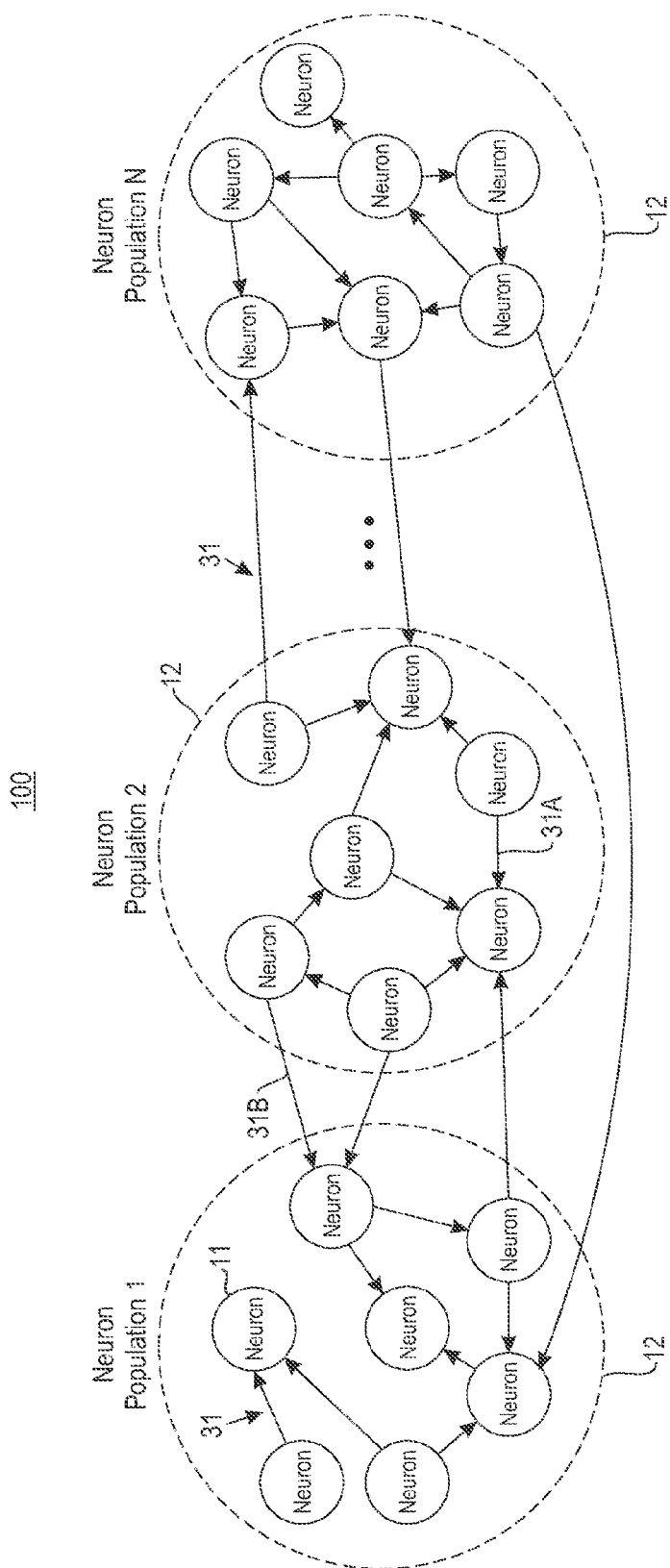
FIG. 1 illustrates a neural network, in accordance with an embodiment of the invention.

Embodiments of the invention relate to a multi-scale spatio-temporal neural network system. One embodiment comprises a neural network including multiple heterogeneous neuron populations that operate at different time scales. Each neuron population comprises at least one digital neuron. Each neuron population further comprises a time scale generation circuit that controls timing for operation of said neuron population, wherein each neuron of said neuron population integrates neuronal firing events at a time scale corresponding to said neuron population. The neural network further comprises a plurality of synapses interconnecting the neurons, wherein each synapse interconnects a neuron with another neuron. At least one neuron receives neuronal firing events from an interconnected neuron that operates at a different time scale.

Another embodiment comprises communicating neuronal firing events between multiple heterogeneous neuron populations, wherein the neuron populations operate at different time scales. Each neuron population comprises at least one digital neuron. Each neuron of each neuron population integrates neuronal firing events targeting said neuron at a time scale corresponding to said neuron population. At least one neuron receives neuronal firing events from a neuron that operates at a different time scale.

Each neuron has a corresponding operational state. Each neuron updates a corresponding operational state based on integrated neuronal firing events. For each neuron population, each neuron of said neuron population updates a corresponding operational state at a time scale corresponding to said neuron population.

Each synapse interconnects a source neuron with a target neuron, wherein the source neuron and the target neuron operate at the same time scale or at different time scales. The synapses include at least one synapse interconnecting a source neuron with a target neuron in the same neuron population, and at least one synapse interconnecting a source neuron with a target neuron in a different neuron population.

Each synapse has a corresponding synaptic weight. Each synapse also has a corresponding axonal delay, wherein the corresponding axonal delay represents the duration a neuronal firing event from a connected source neuron is delayed before the neuronal firing event is processed by a connected target neuron.

The synapses operate at different time scales, such that each synapse updates a corresponding synaptic weight at a time scale corresponding to said synapse. For each synapse, a corresponding synaptic weight of said synapse is adapted as a function of the firing activity of neurons connected to said synapse, corresponding time scales of the connected neurons, and a corresponding time scale of said synapse.

In one embodiment, a central clock is used to generate clock steps, wherein each clock step generated is distributed to each neuron population. For each neuron population, the time scale generation circuit of said neuron population is configured to count the number of clock steps received from the central clock, determine whether the number of clock steps received reaches a time scale threshold parameter of said neuron population, and generate a time step when the number of clock steps received reaches the time scale threshold parameter. The time step generated triggers neuron updates.

In another embodiment, the time scale generation circuit of each neuron population is configured to generate clock steps, count the number of clock steps generated, determine whether the number of clock steps generated reaches a time scale threshold parameter of said neuron population, and generate a time step when the number of clock steps generated reaches the time scale threshold parameter. The time step generated triggers neuron updates.

In one embodiment, each neuron population exchanges neuronal firing events with a different neuron population operating one time scale faster than said neuron population. Each neuron population exchanges neuronal firing events with a different neuron population operating one time scale slower than said neuron population.

The term digital neuron as used herein represents a framework configured to simulate a biological neuron. A digital neuron creates connections between processing elements that are roughly functionally equivalent to neurons of a biological brain. As such, a neuromorphic and synaptronic computation comprising digital neurons according to embodiments of the invention may include various electronic circuits that are modeled on biological neurons. Further, a neuromorphic and synaptronic computation comprising digital neurons according to embodiments of the invention may include various processing elements (including computer simulations) that are modeled on biological neurons. Although certain illustrative embodiments of the invention are described herein using digital neurons comprising digital circuits, the present invention is not limited to digital circuits. A neuromorphic and synaptronic computation according to embodiments of the invention can be implemented as a neuromorphic and synaptronic framework comprising circuitry, and additionally as a computer simulation. Indeed, embodiments of the invention can take the form of an entirely hardware embodiment, an entirely software embodiment or an embodiment containing both hardware and software elements.

In a neural network, neuron dynamics, synapse dynamics, and axonal delays are discretized via a time step. Learning as applied to synapses are also discretized via a time step. A neural network configured for temporal processing allows for a more natural representation of our biological brains.

FIG. 1 illustrates a neural network 100, in accordance with an embodiment of the invention. The neural network 100 comprises multiple heterogeneous neuron populations 12 that operate at different time scales, such as Neuron Population 1, Neuron Population 2, . . . , Neuron Population N. Each neuron population 12 comprises at least one digital neuron 11. Each neuron 11 has a corresponding operational state.

The neural network 100 operates using multi-scale time steps. As described in detail later herein, each neuron population 12 has a corresponding time scale generation circuit 20 (FIG. 2) that controls timing for operation of said neuron population 12. Specifically, each neuron 11 of each neuron population 12 updates a corresponding operational state at a time scale corresponding to said neuron population 12. As such, neurons 11 of a neuron population 12 may update at a different rate than neurons 11 of a different neuron population 12. For example, the neurons 11 of Neuron Population 1 may update every 1 millisecond (ms), the neurons 11 of Neuron Population 2 may update every 100 ms, and the neurons 11 of the Neuron Population N may update every 1000 seconds.

The neural network 100 further comprises a plurality of synapses 31 interconnecting the neurons 11. In this specification, a source neuron 11 is a neuron 11 that sends neuronal firing events, and a target neuron 11 is a neuron 11 that receives firing events. Each synapse 31 interconnects a source neuron 11 to a target neuron 11. Each target neuron 11 updates a corresponding operational state based on neuronal firing events received from interconnected source neurons 11. For each target neuron 11 that receives neuronal firing events from a source neuron 11, said target neuron 11 may operate at the same or a different time scale as the source neuron 11. Each neuron 11 may receive neuronal firing events before said neuron 11 updates.

Each synapse 31 can be classified as one of the following: an intra-synapse 31A, or an inter-synapse 31B. An intra-synapse 31A interconnects a neuron 11 in a neuron population 12 to another neuron 11 in the same neuron population 12. For each neuron 11 that receives neuronal firing events from an interconnected neuron 11 via an intra-synapse 31A, said neuron 11 operates at the same time scale as the interconnected neuron 11.

An inter-synapse 31B interconnects a neuron 11 in a first neuron population 12 to another neuron 11 in another neuron population 12. For each neuron 11 that receives neuronal firing events from an interconnected neuron 11 via an inter-synapse 31B, said neuron 11 operates at a different time scale as the interconnected neuron 11.

Each synapse 31 has a synaptic weight. A learning rule such as spike-timing dependent plasticity (STDP) may be applied to a synapse 31. Each synapse 31 also has a corresponding time scale that said synapse 31 updates its synaptic weight at. Each synapse 31 adapts its synaptic weight as a function of the time scales and firing activity of the two neurons 11 that said synapse 31 interconnects, and the time scale corresponding to said synapse 31.

In one embodiment, inter-synapses 31B transmitting firing events from a neuron population 12 operating at a faster time scale ("fast neuron population") to a different neuron population 12 operating at a lower time scale ("slow neuron population") are assigned lower synaptic weights than the synaptic weights assigned to inter-synapses 31B transmitting firing events from a slow neuron population 12 to a fast neuron population 12. The ratio of the synaptic weights of inter-synapses 31B transmitting firing events from a fast neuron population 12 and the synaptic weights of inter-synapses 31B transmitting firing events from a slow neuron population 12 may be set to the ratio of the time scale of the fast neuron population 12 and the time scale of the slow neuron population 12.

Each synapse 31 has an axonal delay indicating how long a firing event from a connected source neuron 11 should be delayed before the target neuron 11 updates based on the firing event.

Figure 2:
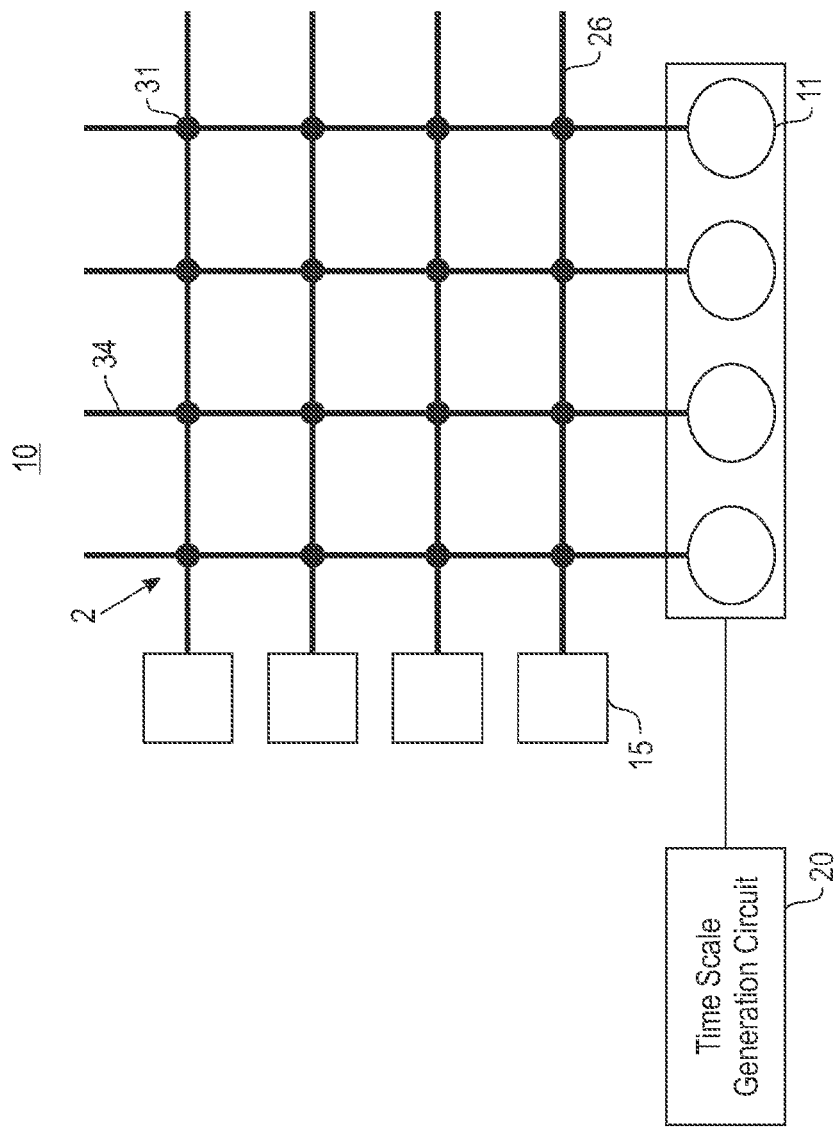
FIG. 2 illustrates a neural core circuit, in accordance with an embodiment of the invention.

FIG. 2 illustrates a neural core circuit 10, in accordance with an embodiment of the invention. In one embodiment, a neuron population 12 may be represented by a neural core circuit ("core") 10. The core 10 comprises multiple neurons 11 and multiple incoming axons 15. Each neuron 11 has configurable operational parameters. The core 10 further comprises a synaptic crossbar 2 including multiple synapses 31, multiple rows/axons paths 26, and multiple columns/dendrite paths 34.

Each axon 15 receives firing events generated by a neuron 11 in the same core 10 or a different core 10. Each synapse 31 communicates firing events between an axon 15 and a neuron 11. Specifically, each synapse 31 is located at crosspoint junction between an axon path 26 and a dendrite path 34, such that a connection between the axon path 26 and the dendrite path 34 is made through said synapse 31. Each axon 15 is connected to an axon path 26, such that said axon 15 sends firing events to the connected axon path 26. Each neuron 11 is connected to a dendrite path 34, such that said neuron 11 receives firing events from the connected dendrite path 34.

In one embodiment, the synapses 31 are binary memory devices. Each synapse 31 can have a weight "0" indicating that said synapse 31 is non-conducting, or a weight "1" indicating that said synapse 31 is conducting.

As stated above, each neuron population 12 has a corresponding time scale generation circuit 20 that controls timing for operation of said neuron population 12. For example, the time scale generation circuit 20 ensures that each neuron 11 of the neuron population 12 updates at a time scale corresponding to the neuron population 12.

Different time scales corresponding to different neuron populations 12 of a neural network may be distributed synchronously or asynchronously. In one embodiment, different time scales are distributed to different neuron populations 12 synchronously. In another embodiment, different time scales are distributed to different neuron populations 12 asynchronously.

Figure 3:
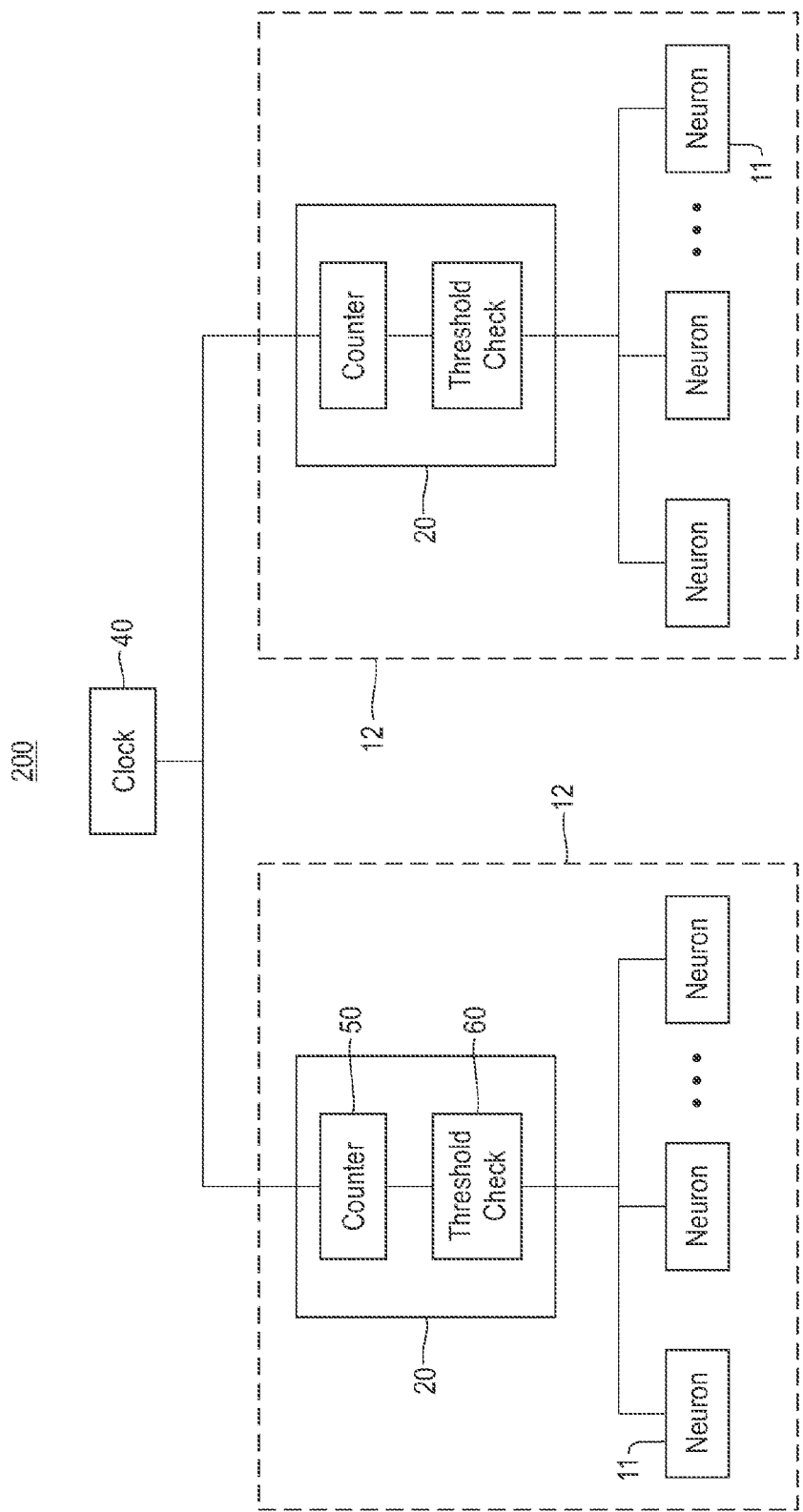
FIG. 3 illustrates a neural network including multiple neuron populations, wherein different time scales are distributed to different neuron populations synchronously, in accordance with an embodiment of the invention.

FIG. 3 illustrates a neural network 200 including multiple neuron populations 12, wherein different time scales are distributed to different neuron populations 12 synchronously, in accordance with an embodiment of the invention. In one embodiment, the neural network 200 further comprises a central clock 40. The central clock 40 is the fastest baseline clock of the neural network 200. The clock 40 is connected to the time scale generation circuit 20 of each neuron population 12 of the neural network 200. The clock 40 produces clock steps that are distributed to every neuron population 12 of the neural network 200.

Each time scale generation circuit 20 generates time steps for a corresponding neuron population 12 based on the clock steps received. In one embodiment, the time scale generation circuit 20 of a neuron population 12 includes a counter unit 50 and a threshold check unit 60. The counter unit 50 is configured to count the number of clock steps received from the clock 40. The threshold check unit 60 is configured to determine whether the number of clock steps received has reached a programmable time scale threshold parameter corresponding to the time scale assigned to the neuron population 12. The programmable time scale threshold parameter may be adjusted to increase or decrease the time scale that the neuron population 12 operates at.

If the time scale threshold parameter is reached, the threshold check unit 60 generates a time step. In one embodiment, the number of clock steps counted is reset. Thus, each time step generated by the time scale generation circuit 20 is a multiple of the clock step generated by the clock 40. In one embodiment, each time step generated may be divided into multiple operational phases, such that the update of neurons 11 is triggered during one phase of said time step.

Each time step generated drives the dynamics of the neurons 11 of the neuron population 12. In one embodiment, each neuron population 12 has a fixed average firing rate that is relative to the time steps generated in the neuron population 12. For example, the neurons 11 of the neuron population 12 may fire on an average every 100 time steps.

Each time step generated also drives the dynamics of the synapses 31 connected to the neurons 11 of the neuron population 12. In one embodiment, each synapse 31 connected to neurons 11 of the neuron population 12 may have fixed temporal parameters that are defined in terms of time steps generated in the neuron population 12.

In one embodiment, each neuron population 12 can communicate (i.e., exchange firing events) with a fast neuron population 12 that is one time scale faster, or a neuron population 12 that is one time scale slower, than the time scale of said neuron population 12. For example, if neurons 11 of a first neuron population 12 update every 10 ms, the neurons 11 of the first neuron population 12 can only communicate with neurons 11 of a different neuron population 12 that update every 1 ms (i.e., one time scale faster) or update every 100 ms (i.e., one time scale slower).

Figure 4:
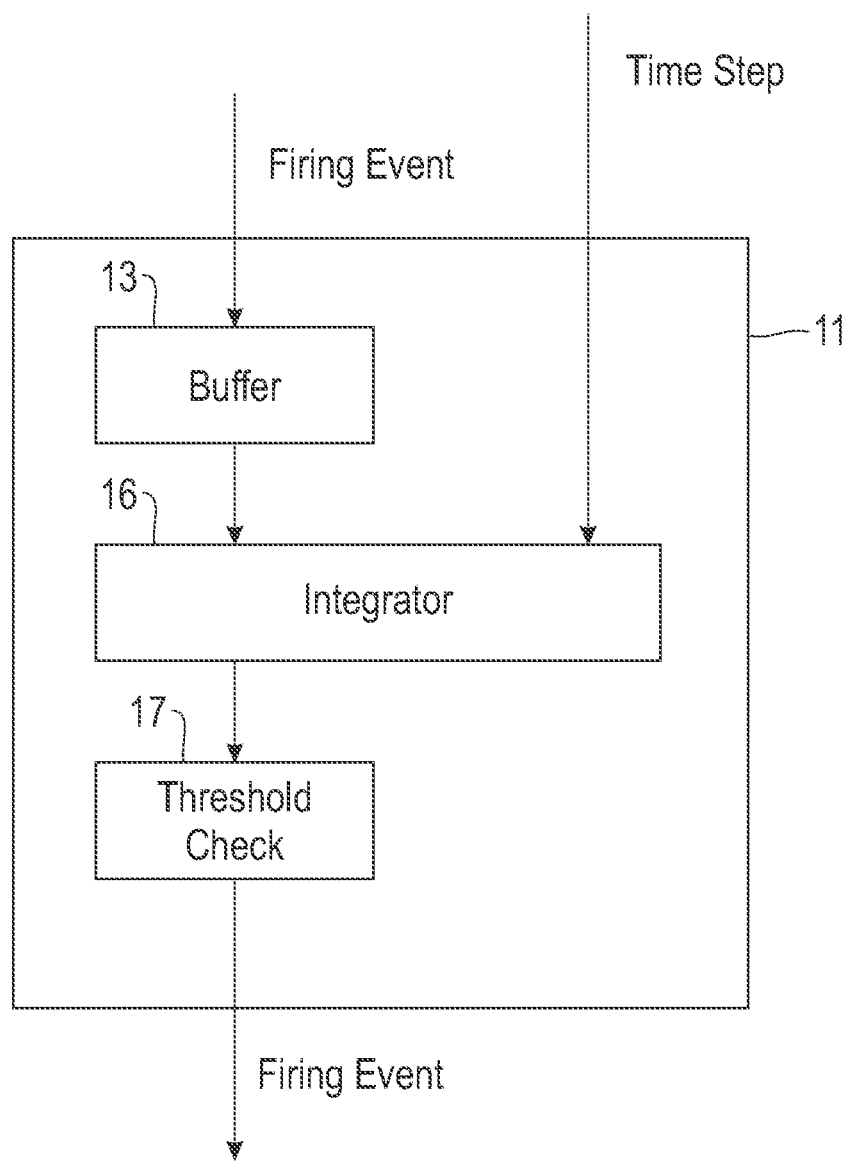
FIG. 4 illustrates components of a neuron of a neuron population, in accordance with an embodiment of the invention.

FIG. 4 illustrates components of a neuron 11 of a neuron population 12, in accordance with an embodiment of the invention. In one embodiment, the neuron 11 comprises a buffer unit 13, an integrator unit 16, and a threshold check unit 17. As stated above, a neuron 11 can receive neuronal firing events before it updates. The buffer unit 13 is configured to receive and maintain firing events received from interconnected neurons 11 before the neuron 11 updates.

The integrator unit 16 is configured to update a corresponding operational state of the neuron 11 at a time scale corresponding to the neuron population 12. Specifically, the integrator unit 16 integrates the firing events received into a membrane potential variable of the neuron 11 upon receiving a signal indicating a time step. A leak rate parameter of the neuron 11 may be applied when the integrator unit 16 integrates the firing events received.

The threshold check unit 17 is configured to determine whether the membrane potential variable of the neuron 11 exceeds a threshold parameter of the neuron 11. If the threshold parameter is exceeded, the threshold check unit 17 generates a firing event.

In one embodiment, neurons 11 in a slow neuron population 12 have a larger leak rate parameter than neurons 11 in a fast neuron population 12. In another embodiment, neurons 11 in a slow neuron population 12 have a larger threshold parameter than neurons 11 in a fast neuron population 12.

Figure 5:
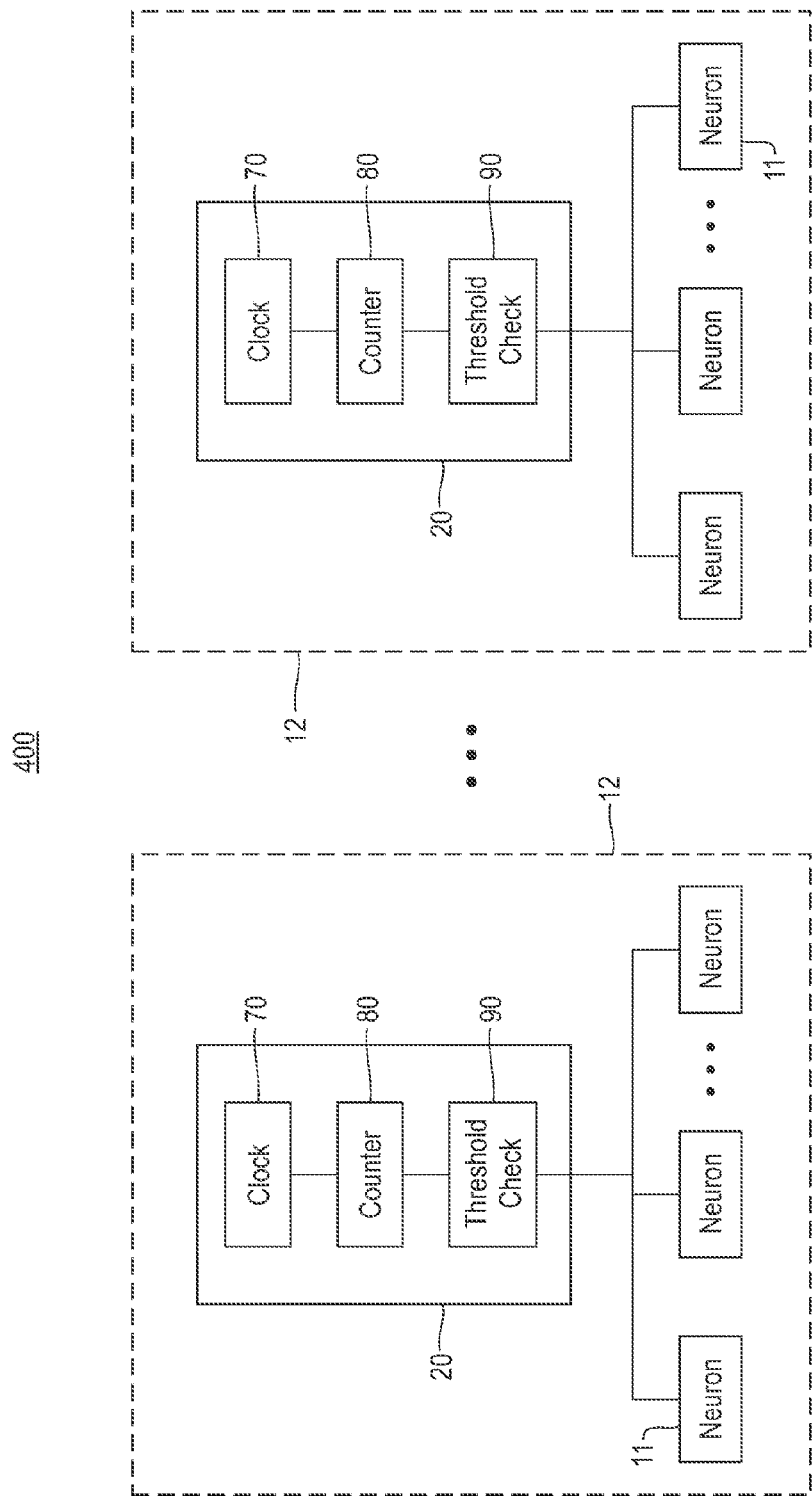
FIG. 5 illustrates a neural network including multiple neuron populations, wherein different time scales are distributed to different neuron populations asynchronously, in accordance with an embodiment of the invention.

FIG. 5 illustrates a neural network 400 including multiple neuron populations 12, wherein different time scales are distributed to different neuron populations 12 asynchronously, in accordance with an embodiment of the invention. In one embodiment, the time scale generation circuit 20 of a neuron population 12 includes an internal clock 70, a counter unit 80, and a threshold check unit 90.

The clock 70 produces clock steps. The counter unit 80 is configured to count the number of clock steps received from the clock 70. The threshold check unit 90 is configured to determine whether the number of clock steps received has reached a programmable time scale threshold parameter corresponding to the time scale assigned to the neuron population 12. The time scale threshold parameter may be adjusted to increase or decrease the time scale that the neuron population 12 operates at.

If the time scale threshold parameter is reached, the threshold check unit 90 generates a time step. Each time step generated drives the dynamics of the neurons 11 of the neuron population 12. Each time step generated also drives the dynamics of the synapses 31 connected to the neurons 11 of the neuron population 12.

Figure 6:
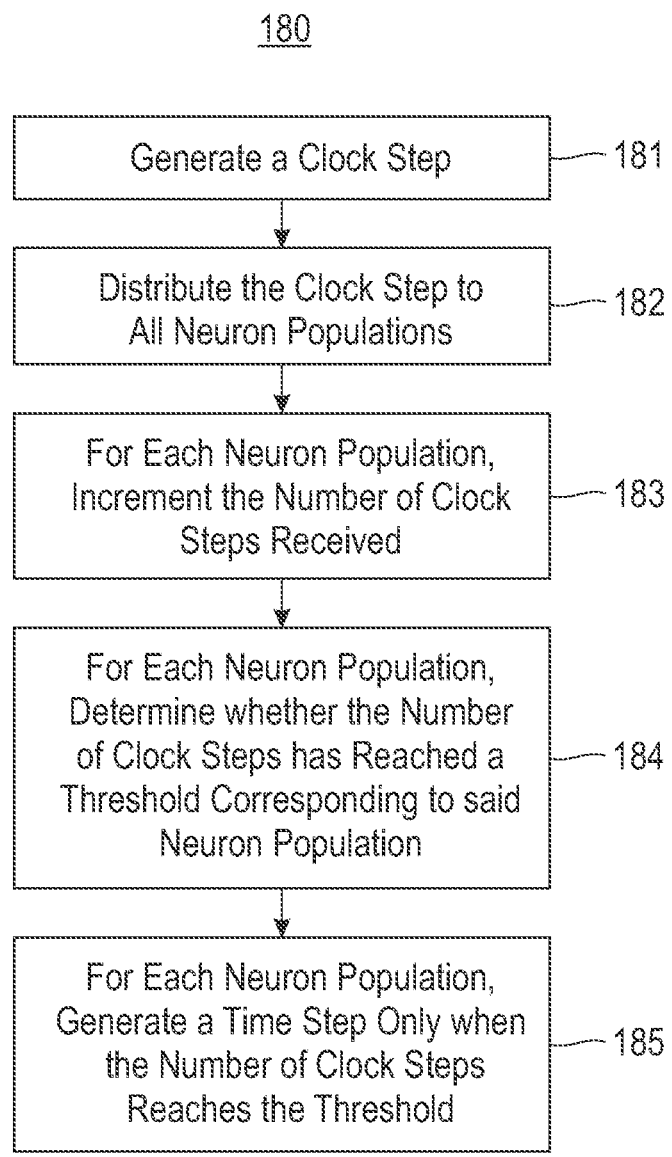
FIG. 6 illustrates a flowchart of an example process for distributing different time scales to different neuron populations of a neural network synchronously, in accordance with an embodiment of the invention.

FIG. 6 illustrates a flowchart of an example process 180 for distributing different time scales to different neuron populations of a neural network synchronously, in accordance with an embodiment of the invention. In process block 181, a central clock of the neural network generates a clock step. In process block 182, the clock step is distributed to all neuron populations of the neural network. In process block 183, each neuron population increments the number of clock steps received. In process block 184, each neuron population determines whether the number of clock steps has reached a time scale threshold parameter corresponding to said neuron population. In process block 185, each neuron population generates a time step only when the number of clock steps reaches the time scale threshold parameter of said neuron population.

Figure 7:
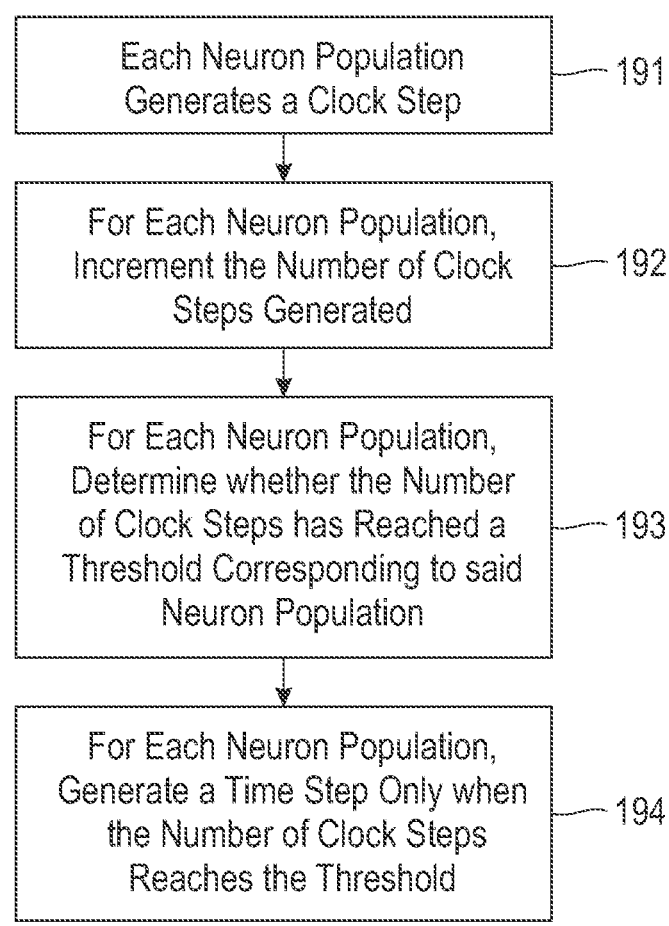
FIG. 7 illustrates a flowchart of an example process for distributing different time scales to different neuron populations of a neural network asynchronously, in accordance with an embodiment of the invention.

FIG. 7 illustrates a flowchart of an example process 190 for distributing different time scales to different neuron populations of a neural network asynchronously, in accordance with an embodiment of the invention. In process block 191, each neuron population generates a clock step. In process block 192, each neuron population increments the number of clock steps generated. In process block 193, each neuron population determines whether the number of clock steps has reached a time scale threshold parameter corresponding to said neuron population. In process block 194, each neuron population generates a time step only when the number of clock steps reaches the time scale threshold parameter of said neuron population.

Figure 8:
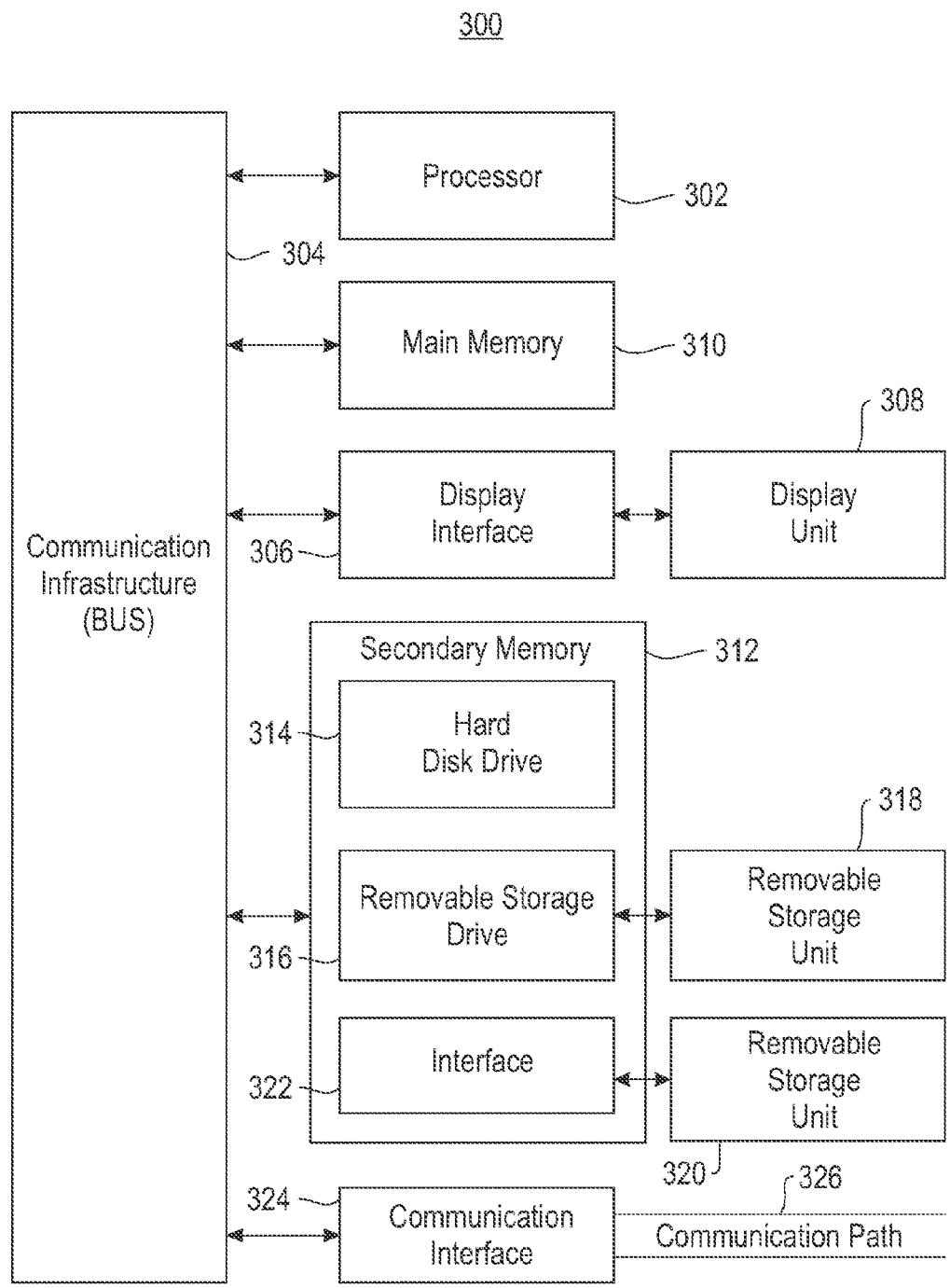
FIG. 8 is a high level block diagram showing an information processing system useful for implementing one embodiment of the invention.

FIG. 8 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. The present invention further provides a non-transitory computer-useable storage medium for hierarchical routing and two-way information flow with structural plasticity in neural networks. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    interconnecting a plurality of heterogeneous neuron populations operating at different time scales via a plurality of synapses, wherein each neuron population is assigned a corresponding time scale, each neuron population comprises a plurality of neurons, and synaptic weights of synapses interconnecting two different neuron populations are based on corresponding time scales assigned to the two different neuron populations; and
    controlling timing of operations of the neuron populations asynchronously, wherein each neuron population operates at a corresponding time scale assigned to the neuron population by generating time steps based on one or more clock steps individually generated by the neuron population.

2. The method of claim 1, wherein:
    each neuron population comprises:
        multiple neurons, wherein at least one neuron of the neuron population receives neuronal firing events from a neuron of another neuron population that operates at a different time scale; and
        a time scale generation circuit for controlling timing of operations of the neuron population at a corresponding time scale.

3. The method of claim 2, wherein controlling timing of operations of the neuron populations asynchronously comprises:
    at each neuron population:
        generating, via a clock of a time scale generation circuit of the neuron population, a clock step;
        incrementing a counter value maintained in a counter unit of the time scale generation circuit, wherein the counter value indicates a number of clock steps generated;
        determining whether the counter value matches a corresponding time scale for the neuron population; and
        generating a time step in response to determining the counter value matches the corresponding time scale.

4. The method of claim 3, the method further comprising:
    at each neuron of each neuron population:
        in response to receiving a time step generated by a time scale generation circuit of the neuron population, integrating neuronal firing events, and updating a corresponding operational state based on the integrated neuronal firing events.

5. The method of claim 2, wherein:
    at least one neuron population exchanges neuronal firing events with another neuron population operating one time scale faster than the neuron population; and
    at least one neuron population exchanges neuronal firing events with another neuron population operating one time scale slower than said neuron population.

6. A system comprising a computer processor, a computer-readable hardware storage medium, and program code embodied with the computer-readable hardware storage medium for execution by the computer processor to implement a method comprising:
    interconnecting a plurality of heterogeneous neuron populations operating at different time scales via a plurality of synapses, wherein each neuron population is assigned a corresponding time scale, each neuron population comprises a plurality of neurons, and synaptic weights of synapses interconnecting two different neuron populations are based on corresponding time scales assigned to the two different neuron populations; and
    controlling timing of operations of the neuron populations asynchronously, wherein each neuron population operates at a corresponding time scale signed to the neuron population by generating time steps based on one or more clock steps individually generated by the neuron population.

7. The system of claim 6, wherein:
    each neuron population comprises:
        multiple neurons, wherein at least one neuron of the neuron population receives neuronal firing events from a neuron of another neuron population that operates at a different time scale; and
        a time scale generation circuit for controlling timing of operations of the neuron population at a corresponding time scale.

8. The system of claim 7, wherein controlling timing of operations of the neuron populations asynchronously comprises:
    at each neuron population:
        generating, via a clock of a time scale generation circuit of the neuron population, a clock step;
        incrementing a counter value maintained in a counter unit of the time scale generation circuit, wherein the counter value indicates a number of clock steps generated;
        determining whether the counter value matches a corresponding time scale for the neuron population; and
        generating a time step in response to determining the counter value matches the corresponding time scale.

9. The system of claim 8, the method further comprising:
    at each neuron of each neuron population:

in response to receiving a time step generated by a time scale generation circuit of the neuron population, integrating neuronal firing events, and updating a corresponding operational state based on the integrated neuronal firing events.

10. The system of claim 7, wherein:
at least one neuron population exchanges neuronal firing events with another neuron population operating one time scale faster than the neuron population; and
at least one neuron population exchanges neuronal firing events with another neuron population operating one time scale slower than said neuron population.

11. A computer program product comprising a computer-readable hardware storage device having program code embodied therewith, the program code being executable by a computer to implement a method comprising:
interconnecting a plurality of heterogeneous neuron populations operating at different time scales via a plurality of synapses, wherein each neuron population is assigned a corresponding time scale, each neuron population comprises a plurality of neurons, and synaptic weights of synapses interconnecting two different neuron populations are based on corresponding time scales assigned to the two different neuron populations; and
controlling timing of operations of the neuron populations asynchronously, wherein each neuron population operates at a corresponding time scale assigned to the neuron population by generating time steps based on one or more clock steps individually generated by the neuron population.

12. The computer program product of claim 11, wherein:
each neuron population comprises:
multiple neurons, wherein at least one neuron of the neuron population receives neuronal firing events from a neuron of another neuron population that operates at a different time scale; and
a time scale generation circuit for controlling timing of operations of the neuron population at a corresponding time scale.

13. The computer program product of claim 12, wherein controlling timing of operations of the neuron populations asynchronously comprises:
at each neuron population:
generating, via a clock of a time scale generation circuit of the neuron population, a clock step;
incrementing a counter value maintained in a counter unit of the time scale generation circuit, wherein the counter value indicates a number of clock steps generated;
determining whether the counter value matches a corresponding time scale for the neuron population; and
generating a time step in response to determining the counter value matches the corresponding time scale.

14. The computer program product of claim 13, the method further comprising:
at each neuron of each neuron population:
in response to receiving a time step generated by a time scale generation circuit of the neuron population, integrating neuronal firing events, and updating a corresponding operational state based on the integrated neuronal firing events.

15. The computer program product of claim 12, wherein:
at least one neuron population exchanges neuronal firing events with another neuron population operating one time scale faster than the neuron population; and
at least one neuron population exchanges neuronal firing events with another neuron population operating one time scale slower than said neuron population.

* * * * *